United States Patent Office 2,779,123
Patented Jan. 29, 1957

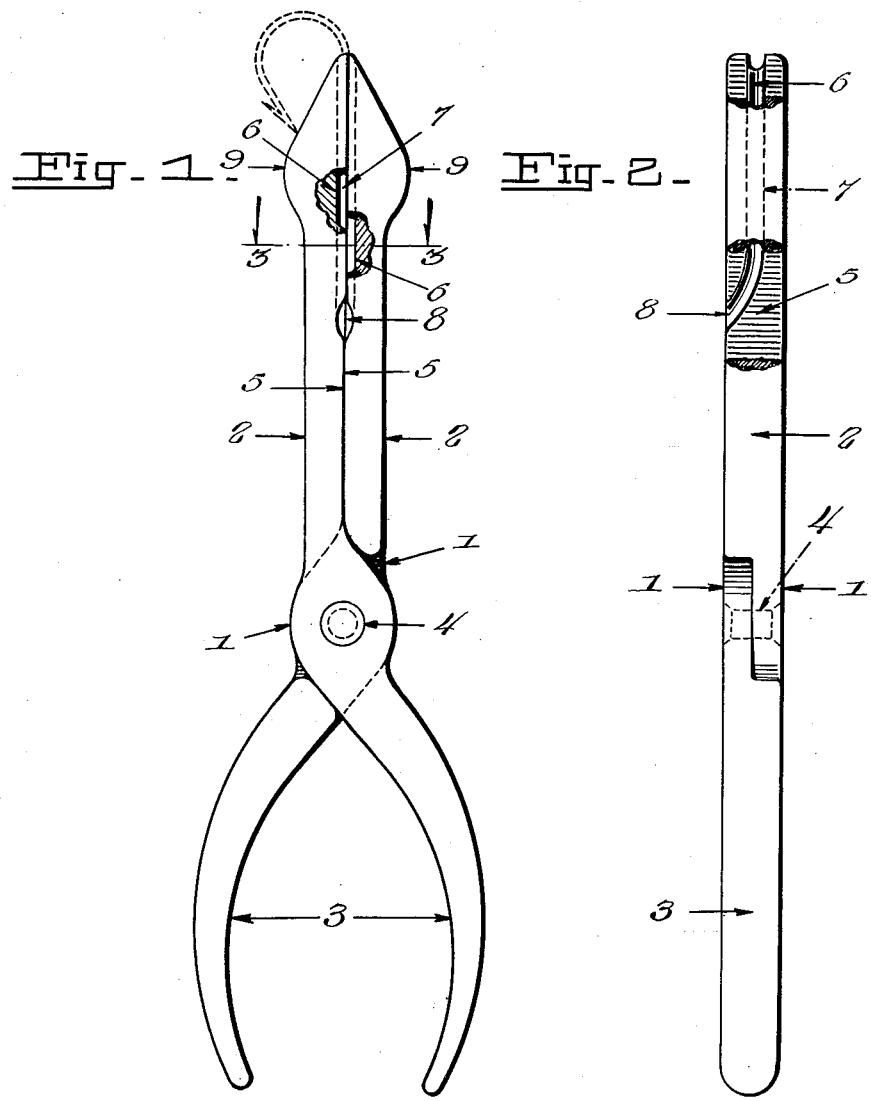
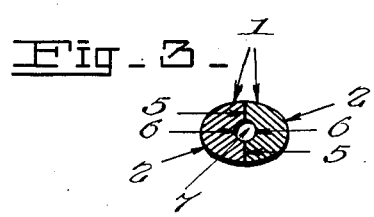

2,779,123

FISHHOOK EXTRACTOR

Fred E. White, Ixonia, Wis., assignor to Arthur A. Tellier and Florence T. Tellier, Watertown, Wis.

Application September 30, 1954, Serial No. 459,235

1 Claim. (Cl. 43—53.5)

This invention pertains to fish hook extractors, and has primarily for its object to provide an extracting tool utilizing a plier principle, affording firm positive grip and control of an imbedded fish hook, and having a passageway formed between the jaws of the tool for loosely receiving and confining a fish line or leader to guide the tool to the hook when the same is obscured from view.

With the above and other objects in view, the invention resides in the novel features of construction fully described in the specification, and more particularly defined by the appended claim, it being understood that modifications in structure and design are contemplated within the scope of the invention.

In the drawing:

Figure 1 is a face elevational view of an extracting tool incorporating principles of the present invention, parts being broken away and in section to more clearly illustrate structural details;

Figure 2 is an edge elevational view, partially broken away and in section; and

Figure 3 is a transverse sectional view taken on the line 3—3 of Figure 1.

Referring now more particularly to the accompanying drawing, that form of the invention illustrated consists of a pair of pivotly connected complementary plier sections 1, each section comprising a jaw 2 and an extended offset hand grip 3. The sections are pivotly connected between the jaws and hand grips by a pintle 4 of any type, such as a rivet, screw, or bolt.

The jaws 2 are substantially semi-circular in cross-section, having flat internal faces 5, abutting each other through pressure exerted on the hand grips 3. Complementary semi-circular grooves 6 are formed in the abutting faces 5 of the jaws 2 to provide a central longitudinal passageway 7, extending from the outer ends of the jaws to an intermediate point, at which the grooves veer in the arc of a circle to one side of the jaws to provide an exit 8 for the passageway.

While not essential to the invention, it is preferred to form the jaws with a slight exterior enlargement 9, tapering towards the tip of the jaws. These enlargements form a guard for the barbed end of a fish-hook, as shown in dotted lines in Figure 1, to facilitate withdrawal of the hook from within a fish.

In practice, when it is desired to remove an imbedded hook from the mouth, gills or throat of a fish, the jaws 2 are opened by manipulation of the hand grips 3 and the fish line or leader is trained in one of the grooves 6, and loosely confined within the passageway 7 when the jaws are closed. The tool is thus readily guided to an imbedded hook which is then firmly gripped between the jaws to permit positive manipulation for extracting the hook from its imbedded position.

From the foregoing explanation, considered in connection with the accompanied drawing, it will be apparent that an exceedingly simple and inexpensive tool has been devised to facilitate removal of imbedded fish hooks, without injury to the angler's hands, or damage to the hook, line, or leader.

I claim:

A fish hook extractor comprising a pair of elongated pivotally connected jaws, said jaws having flat inner surfaces abutting throughout the lengths thereof, said jaws having complementary semi-circular grooves formed longitudinally thereof in the flat surfaces of said jaws, said grooves extending from the tips of said jaws and terminating in portions gradually curved laterally in the arc of a circle to one side of said jaws, providing a passageway in which a fishing line passing through said passageway is loosely held and guided, and said jaws having spreading enlargements extending laterally from the outer surfaces of said jaws at the free ends of said jaws, said enlargements tapering to a sharply pointed end.

References Cited in the file of this patent

UNITED STATES PATENTS

| | | |
|---|---|---|
| 385,318 | Norris | June 26, 1888 |
| 1,753,080 | Zwilling | Apr. 1, 1930 |
| 2,074,394 | Hoffer | Mar. 23, 1937 |
| 2,531,522 | Halouf | Nov. 28, 1950 |

FOREIGN PATENTS

| | | |
|---|---|---|
| 10,424 | Great Britain | 1891 |